March 10, 1925.
F. L. MAIN
BUILT UP WHEEL
Filed July 13, 1923
1,528,936
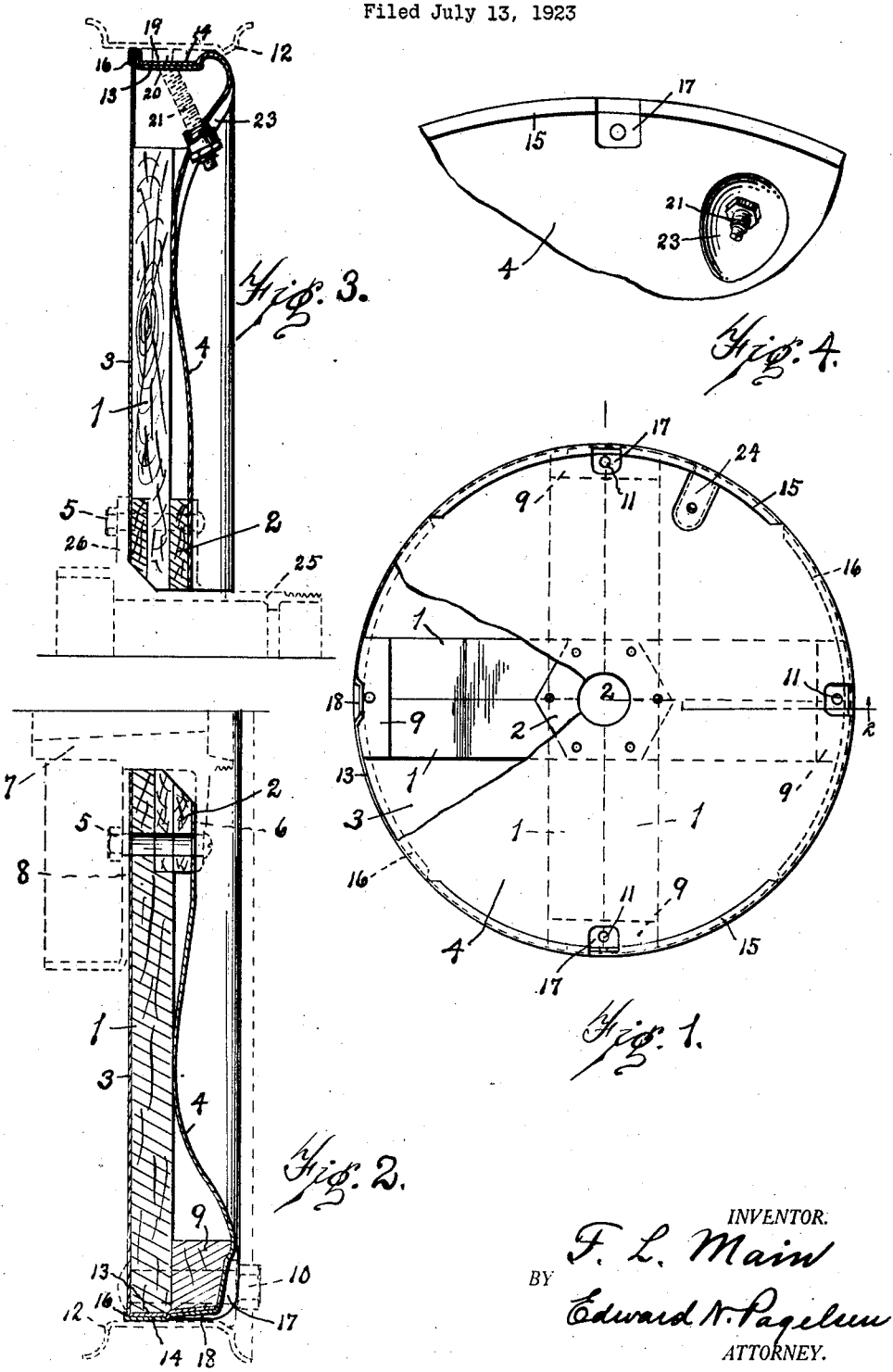
INVENTOR.
F. L. Main
BY
Edward N. Pageleen
ATTORNEY.

Patented Mar. 10, 1925.

1,528,936

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

BUILT-UP WHEEL.

Application filed July 13, 1923. Serial No. 651,400.

*To all whom it may concern:*

Be it known that I, FRANK L. MAIN, a citizen of the United States, and residing at Birmingham, in the county of Oakland and State of Michigan, have invented a new and Improved Built-Up Wheel, of which the following is a specification.

This invention relates to the construction of vehicle wheels designed to receive demountable rims carrying pneumatic tires, and consists in a built-up construction embodying a hub and spokes at right angles to each other, and sheet metal discs secured to the hub and so bent at their peripheries as to constitute a felly to receive the demountable rim.

It further consists of a wheel of this character in which each of the discs is formed with felly sections which alternate with those of the other disc and which sections terminate in circumferential flanges lapping the edge of the other disc.

It also consists of the details of construction illustrated in the accompanying drawing and particularly pointed out in the claims.

In the drawing, Fig. 1 is an elevation of a wheel embodying the present invention, a portion of the disc being broken away. Fig. 2 is a radial section on the line 2—2 of Fig. 1. Fig. 3 is a radial section of a slightly modified construction of wheel. Fig. 4 is an elevation of a portion of the wheel shown in Fig. 3.

Similar reference characters refer to like parts throughout the several views.

The hubs for wheels of this character may be of any desired construction. The wheels are built up of radially extending flat wooden spokes of sufficient width to leave enough material around the hole for the hub to receive the bolts which secure the wheel to the hub. I prefer to form each spoke of two parts 1, and to notch the middle portions of the spokes so that they may lie in the same plane. Instead of the spokes extending from the hub outward, they may be long enough to extend entirely across the wheel. A reinforcing hexagon ring 2 of wood may be secured to the spokes at the hub. Discs 3 and 4 on opposite sides of the spokes fit against these spokes and against the ring 2 and are secured in position by means of the bolts 5 which also pass through the flange 6 on the hub 7, and, if desired, through the circular portion 8 of the brake drum.

In Figs. 1 and 2 reinforcing blocks 9 are shown secured to the ends of the spokes and receiving the bolts 10 which also extend through holes 11 in the discs and through holes in the short lugs which extend inward from the demountable rim 12, not shown, by means of which the rim is secured in position.

The discs are formed with four circumferential flanges 13 and 14 respectively, each preferably ninety degrees in length, the alternate flanges of each disc being on the outside of the alternate flanges of the other disc. In this manner, these flanges constitute a felly of two thicknesses of metal, and the edges 15 and 16 of the outer flanges are bent at right angles to lap the edge of the opposite disc.

The reinforcing blocks and the disc on the outer side of the wheel are formed with depressions 17 to receive the lugs on the demountable rim, and the flanges are also formed with depressions 18 for this purpose. These flanges are also formed with a depression 19 to receive the nut 20 on the valve tube 21, as indicated in Fig. 3. The disc 4 may be formed with a depression 23 as shown in Figs. 3 and 4 to permit this tube to project through, or the depression 24 may be extended to the flange 15, as indicated in Fig. 1.

In Fig. 3, the hub 25 is indicated as provided with a flange 26 nearer the inner end and the wheel is shown secured to the front side of this flange while in Fig. 2 the arrangement is the opposite.

The details of construction and the proportions of the parts may all be changed by those skilled in the art without departing from the spirit of my invention as set forth in the following claims.

I claim:—

1. In a wheel, a series of spokes radiating from a common center and lying in the same plane, the middle portions of the spokes being notched and overlapping, a sheet metal disc on each side of the spokes, the peripheries of said discs being bent to overlap to constitute a felly to receive a demountable rim, and means to secure the rim onto the wheel.

2. In a wheel, a series of spokes radiating from a common center, a reinforcing block secured to the outer end of each spoke, a sheet metal disc on each side of the spokes, the peripheries of said discs being bent to overlap to constitute a felly to receive a demountable rim, and bolts extending through the discs, spokes and reinforcing blocks to secure the rim in position.

3. In a wheel, a series of flat spokes crossing each other at the middle of the wheel and notched so as to be in the same plane, a reinforcing ring for said spokes at the center of the wheel, a sheet metal disc on each side of the spokes, the peripheries of said discs being bent to overlap to constitute a felly to receive a demountable rim, and means to secure the rim onto the wheel.

4. In a wheel, a series of flat spokes radiating from a common center and having their middle portions overlapping and notched so that the spokes lie in the same plane, a reinforcing block secured to the outer end of each spoke at one side of the plane of the spokes, a sheet metal disc on each side of the spokes, the peripheries of said discs being bent to overlap to constitute a felly to receive a demountable rim and one of the discs and said reinforcing blocks being formed with recesses to receive lugs on the rim, and bolts extending through the discs, spokes and reinforcing blocks to secure the lugs within the recesses.

5. In a wheel, a series of flat spokes radiating from a common center, a sheet metal disc on each side of the spokes, the peripheries of the discs being slitted and bent to constitute an equal number of substantially cylindrical flanges of which alternate flanges of each disc overlap the opposite flange of the other disc to constitute a felly to receive a demountable rim, and means to secure a rim onto the wheel.

6. In a wheel, a series of flat spokes radiating from a common center, a sheet metal disc on each side of the spokes, the peripheries of the discs being slitted and bent to constitute an equal number of substantially cylindrical flanges of which alternate flanges of each disc overlap the opposite flange of the other disc and the edges of said outer flanges are bent radially inward to overlap the edge of the circular portion of said other disc, and means to secure the rim onto the wheel.

FRANK L. MAIN.